US011511444B2

(12) United States Patent
Nowacki et al.

(10) Patent No.: US 11,511,444 B2
(45) Date of Patent: Nov. 29, 2022

(54) GRIPPER FOR A BOTTLE CAPPING MACHINE

(71) Applicant: UNILOGO ROBOTICS Sp. z o.o., Piaseczno (PL)

(72) Inventors: Tomasz Nowacki, Warsaw (PL); Marcin Papiernik, Nowa Sucha (PL)

(73) Assignee: UNILOGO ROBOTICS Sp. z o. o., Piaseczno (PL)

( * ) Notice: Subject to any disclaimer, the term of this patent is extended or adjusted under 35 U.S.C. 154(b) by 119 days.

(21) Appl. No.: 16/925,565

(22) Filed: Jul. 10, 2020

(65) Prior Publication Data

US 2021/0008733 A1 Jan. 14, 2021

(30) Foreign Application Priority Data

Jul. 12, 2019 (EP) .................................... 19461555
Jan. 10, 2020 (EP) .................................... 20151272

(51) Int. Cl.
*B25J 15/10* (2006.01)
*B65B 7/28* (2006.01)
*B25J 15/00* (2006.01)

(52) U.S. Cl.
CPC .......... *B25J 15/103* (2013.01); *B25J 15/106* (2013.01); *B25J 15/0033* (2013.01); *B65B 7/2835* (2013.01)

(58) Field of Classification Search
CPC ........................ B25J 15/0033; B25J 15/0038; B25J 15/0042; B25J 15/0266; B25J 15/0273; B25J 15/103; B25J 15/106; B65B 7/2835
See application file for complete search history.

(56) References Cited

U.S. PATENT DOCUMENTS 4,232,499 A * 11/1980 Holstein ............... B67B 3/2073
53/331.5
4,540,211 A * 9/1985 Masserang ........... B25J 15/0266
294/99.1

(Continued)

FOREIGN PATENT DOCUMENTS

CN 107720658 A 2/2018
DE 102016107167 A1 10/2017

(Continued)

OTHER PUBLICATIONS

Extended European Search Report, Application No. 19461555.5, dated Jan. 15, 2020, 5 pages.

(Continued)

*Primary Examiner* — Dean J Kramer
(74) *Attorney, Agent, or Firm* — Ziegler IP Law Group, LLC

(57) ABSTRACT

A gripper for capping machines intended for screwing a cap onto a container adapted to being capped, in particular has a threaded neck for being capped. The gripper has a body capable of revolving on the axis of rotation, and at least two levers adapted to taking at least two different positions. The first position in which it is possible to insert a cap between the gripper levers and the second position in which the cap is locked between the gripper levers at least rotationally. At least one moving guiding shackle hinge-is mounted to the body and at least one lever which is slidingly mounted to the gripper body by means of a guide enabling movement of the lever in a horizontal direction, perpendicular to the axis of the gripper, and the end of the guiding shackle is slidingly and rotatably mounted to the at least one lever.

11 Claims, 3 Drawing Sheets

(56) References Cited

U.S. PATENT DOCUMENTS

Figure 1:
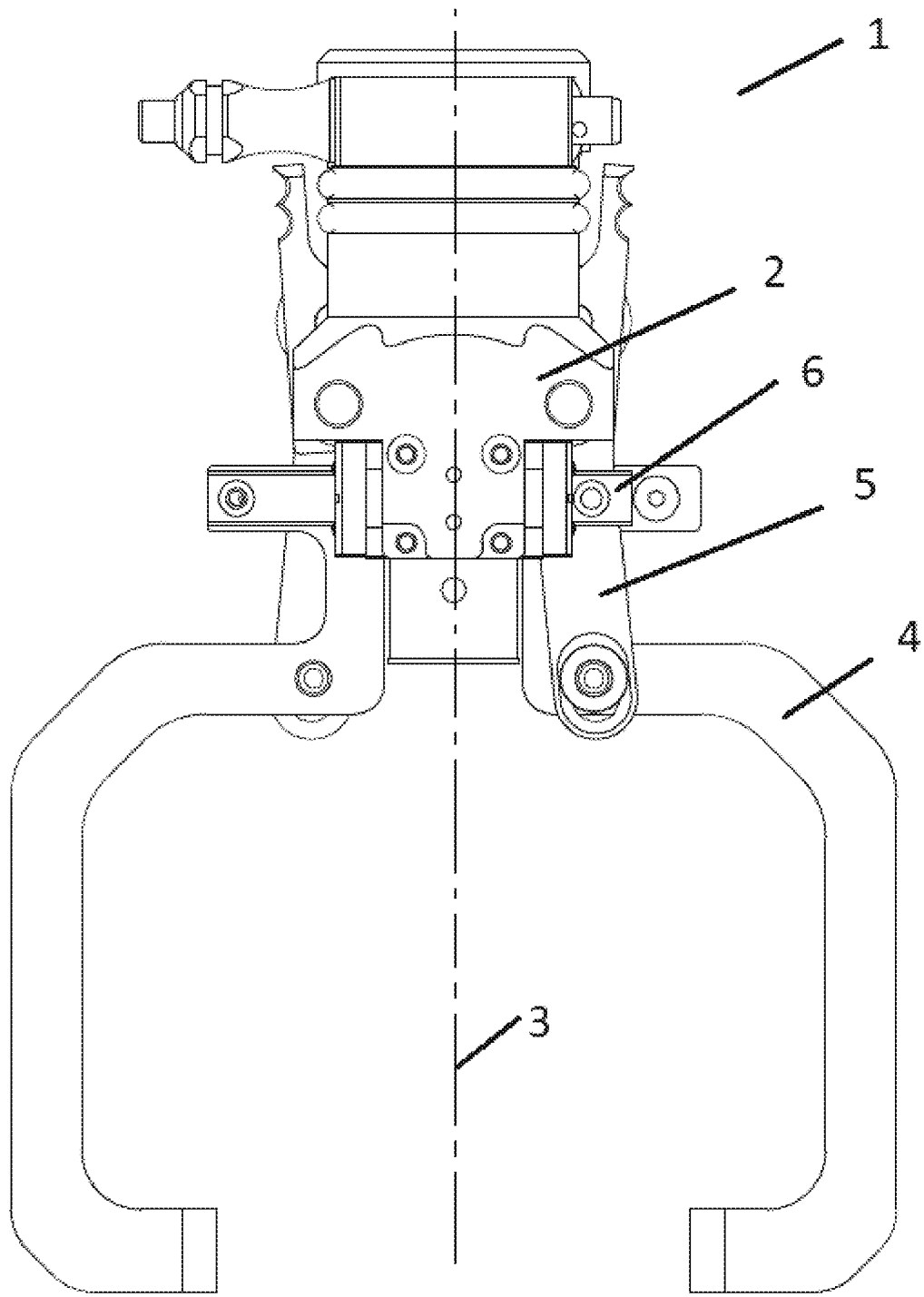

| | | | | |
|---|---|---|---|---|
| 4,662,153 | A * | 5/1987 | Wozniak | B67B 3/2073 53/317 |
| 5,983,596 | A * | 11/1999 | Corniani | B67B 3/2073 53/317 |
| 6,044,626 | A * | 4/2000 | Harper | B67B 3/2066 53/317 |
| 6,092,848 | A * | 7/2000 | Maffeis | B25J 15/0213 294/119.1 |
| 6,338,441 | B1 * | 1/2002 | Umezawa | B05B 9/047 239/223 |
| 7,866,237 | B2 * | 1/2011 | Vesentini | B65B 7/2835 81/467 |
| 8,375,682 | B2 * | 2/2013 | Zanini | B65B 59/04 53/317 |
| 9,381,648 | B1 * | 7/2016 | Liu | B25J 15/10 |
| 9,388,031 | B2 * | 7/2016 | Schoenfelder | B67B 3/2066 |

FOREIGN PATENT DOCUMENTS

| | | | |
|---|---|---|---|
| DE | 102017208972 A1 * | 11/2018 | B25J 15/0273 |
| EP | 2881359 A1 | 6/2015 | |
| EP | 2808290 B1 | 2/2017 | |
| WO | 2005007556 A1 | 1/2005 | |
| WO | 2014034883 A1 | 3/2014 | |
| WO | 2018073761 A1 | 4/2018 | |

OTHER PUBLICATIONS

Extended European Search Report, Application No. 20151272.0, dated Jul. 31, 2020, 8 pages.

* cited by examiner

GRIPPER FOR A BOTTLE CAPPING MACHINE

FIELD

The aspects of the disclosed embodiments are directed to a gripper for bottle capping machines, which is an element of an automatic bottle capping head, especially in automatic multi-head lines that cap multiple bottles at the same time.

BACKGROUND

Document EP 2 808 290 B1 describes a tightening system designed to put pumps with means for dispensing on containers, fitted with a ring-shaped retaining cap and, in particular, pertains to a method and a device for tightening the ring-shaped cap of the pump with the means for dispensing—using lever-type means for gripping. Said levers are hinged at the pivot point and turned out parallel to the axis as well as turned angularly towards the same axis until they come into contact with the ring-type cap in order to achieve the correct position. Such a solution forces a considerable distance to be maintained between the grippers in multi-head systems. In the open position, the pivoting levers turn out in order to release the grip and, due to the hinged mounting of the levers, their stroke (travel) and the occupied space at the bottom of the gripper is large and increases in proportion to the length of the levers. Another disadvantage is the single point of transmission of the tightening torque, which falls on the place of the hinged attachment. The hinge is the bearing place for the gripper's pivoting levers, as well as the place where the tightening torque is transmitted. This creates considerable torsional stresses at this place, whereas the transmission of the torsional stresses through the element designed to transfer axial stresses causes the hinge element to wear out quickly.

Document WO2014034883 (A1) describes a solution that uses capping machine grippers that perform a parallel movement of jaws moving along sliding or rolling guides with pneumatic drive. This solution requires grippers of considerable size and weight, fitted with guides capable of transmitting the cap-tightening torque that generates significant torsional stresses in the gripper's guides. In addition, the opening of the sliding guides requires a gear drive or actuator brought to the place of attachment of the arms, that revolves quickly while the cap is being tightened. The large size and weight of the gripper, in addition to the disadvantages described above, increase the time needed to accelerate and slow down the rotational movement of the capping machine's head, and reduce the time efficiency of the bottle capping machine—especially in automatic multi-head lines designed for capping multiple bottles at the same time.

Document EP19461555 discloses a gripper with at least one lever mounted to the gripper body by means of at least two moving arms, each of which is hinge-mounted to the body and to this lever, wherein the moving arms and the lever being configured such that, during a change in the position of the lever from the first position to the second position, the moving arms rotate relative to the gripper body and said at least one lever moves down or up relative to the gripper body, while the axis of this lever defined as a straight line passing through the points of the hinged mounting of the moving arms to this lever jest parallel to the axis of rotation of the gripper both in the first position and in the second position. A gripper of this construction requires considerable space around itself; an upward or a crimping movement is required in order to apply a tightening move to the cap. Due to this, the bottle capper has a less preferable construction which requires providing space for the movement of the capper in two directions.

SUMMARY

Therefore, the aim of the aspects of the disclosed embodiments is to provide a gripper without the above disadvantages.

A gripper for capping machines, in particular multi-head capping machines, intended for screwing a cap onto a container, in particular a bottle, said container is adapted to being capped, in particular has a threaded neck for being capped, where said gripper comprises: a body capable of revolving on the axis of rotation, and at least two levers adapted to taking at least two different positions:
  the first position in which it is possible to insert a cap between the gripper levers;
  the second position in which the cap is locked between the gripper levers at least rotationally;
is characterised in that is has at least one moving guiding shackle, hinge-mounted to the body, and at least one lever which is slidingly mounted to the gripper body by means of a guide enabling movement of the lever in a horizontal direction, perpendicular to the axis of the gripper, and the end of the guiding shackle is slidingly and rotatably mounted to the at least one lever.

Preferably, the lever and the guiding shackle are mounted such that rotation of the guiding shackle in a first direction causes the lever to slide inwards and take on a first position, while rotation of the guiding shackle in an opposite direction causes the lever to slide outwards and take on a second position.

Preferably, two or more levers are attached to the gripper body, especially three, four, five, or six levers.

Preferably, the levers are distributed in an axially symmetrical way.

Preferably, guiding shackles mounted to different levers have different lengths.

Preferably, the axis of a lever is parallel to the axis of rotation of the gripper in every position of the lever.

Preferably, the lower ends of the levers are fitted with gripping tips that have a surface intended to transmit the tightening torque, wherein the tightening torque is preferably transmitted by friction through flexible overlays or by shape through overlays that correspond to the shape of the cap.

Preferably, the gripping tips are adapted so as to avoid any protruding elements of the cap, especially the lever of the cap, thanks to the fact that the gripping tips extend from the point of contact of the gripping tip with the cap in a direction away from the gripper axis, first downwards as seen from the gripper axis.

Preferably, the capping machine of the rotary or linear type and comprises at least one gripper.

BRIEF DESCRIPTION OF EMBODIMENTS

The aspects of the disclosed embodiments will now be explained in more detail using preferable embodiments, with reference to the enclosed drawings, where:

FIG. 1 Presents a front view of the gripper without the attached gripping tips

Figure 2:
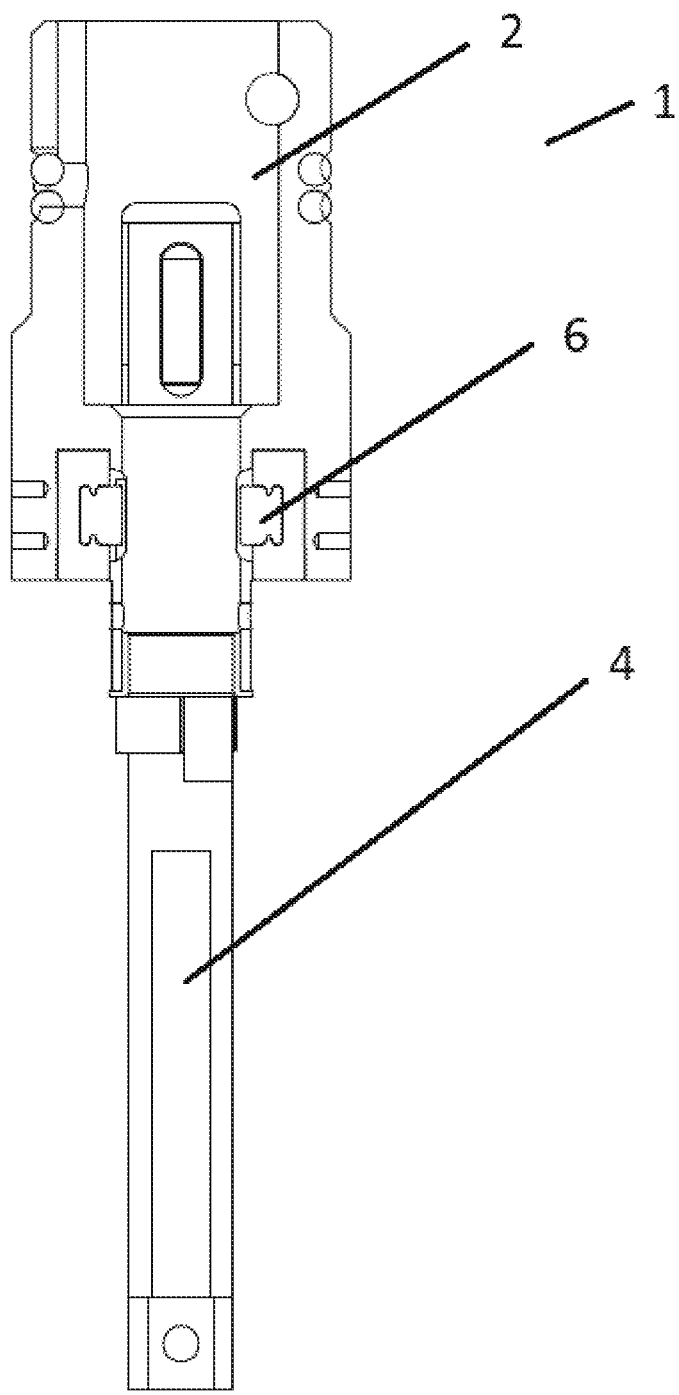
Figure 3:
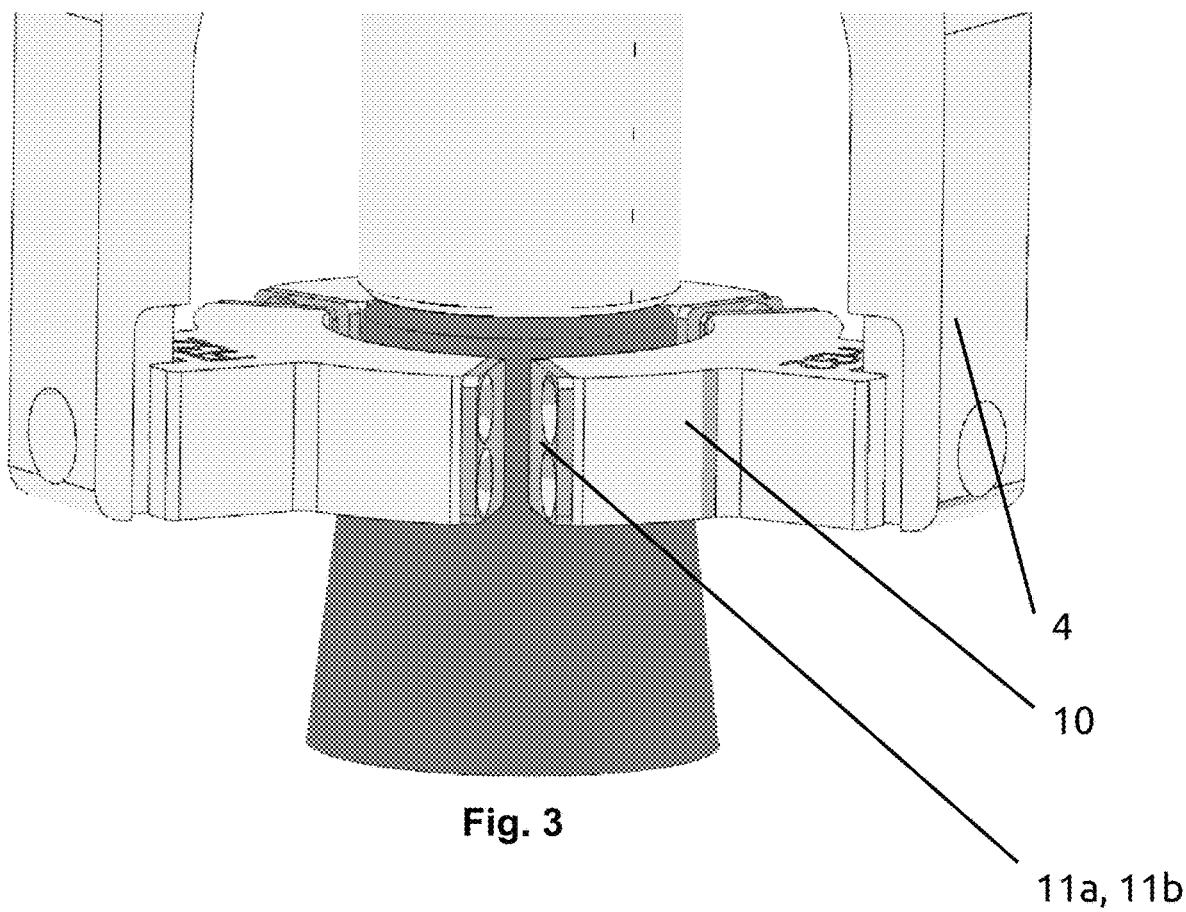

FIG. 2 Presents a cross-section of the gripper without the attached gripping tips FIG. 3 Presents the levers 4 with the attached gripping tips with a flexible part 11a or a rigid part (11b).

In a preferable embodiment, the cap gripper is mounted on a multi-head machine, i.e. a machine that is equipped with more than one gripper, designed for the capping of containers, e.g. bottles that have necks threaded for this purpose. The gripper 1 comprises a body 2 that can revolve on its axis 3 of rotation, as well as two levers 4 attached symmetrically in relation to the axis 3 of gripper, with gripping tips 10 mounted on the ends of the levers 4 adapted to taking at least two different positions:

the first position, in which it is possible to insert a cap between the levers 4 of the gripper 1. In other words the open position, in which the distance between the gripping tips 10 of the gripper is greater than the diameter of the cap. In this position, a cap is inserted between the gripping tips 10 of the gripper 1, e.g. by means of an automatic loading unit;

the second position, in which the cap is locked between the levers 4 of the gripper 1. In other words the closed position, in which the distance between the gripping tips 10 of the gripper 1 is less than the diameter of the cap—if using flexible ends of the tips 10 of the levers 4 of the gripper 1 (the flexible ends of the gripper tips bend), or equal to the diameter of the cap—if using rigid tips 10. In this position, the cap is locked at least rotationally between the gripping tips 10 of the gripper 1. This means that the tips 10 of the gripper 1 are shaped in such a way that they at least prevent the cap from rotating in relation to the gripper 1 (they block at least one degree of freedom—rotation on the axis of the gripper). The suitably shaped ends of the tips 10 of the gripper 1 reflect the shape of the cap, e.g. if the cap is hexagonal, then the tips 10 of the gripper 1 are suitably shaped as sections of a hexagon. A gripper 1 of this type prevents the cap from revolving in relation to the axis of rotation 3 of the gripper 1, and leaves one aspect of freedom i.e. the sliding movement of the cap along the vertical axis, especially downwards. This solution allows the cap to slide freely out of the gripper 1 while it is being tightened, thanks to which the gripper 1 can remain at the same height as the caps are being tightened. This allows the gripper 1 to tighten caps that have various pitches of thread.

In a preferable embodiment, the gripping tips 10 of the gripper 1 have a flexible part 11a made of flexible material such as polymer material, rubber, foamed polymer, foamed metal, a metal or polymer spring, soft wood, woven fabric, sponge, or other material capable of deforming under pressure and adapting its shape to the shape of the cap in order to increase the tightening torque being transmitted. In the case of using the gripping tips 10 with a flexible part 11a, in the second (closed) position of the levers 4 of the gripper 1 the gripping tips 10 of the gripper 1 are at a distance less than the diameter of the cap, and the cap is prevented from both rotating and sliding. In this case, the tightening torque is transmitted by friction or by shape and friction.

The flexible part 11a is attached to the gripping tip 10 of the gripper 1 in a permanent or detachable manner, e.g. by gluing, riveting, screwing, shape-fitting, overmoulding, pouring over, or any other means known in the state of the art. The flexible part 11a and the gripping tip 10 form a solid element or an assembly of elements.

In another preferable embodiment, the gripping tips 10 have a rigid part 11b shaped so that the shape of the gripping tip 10 reflects the negative shape of the side surface of the cap. In the case of using the gripping tips 10 ended with a rigid part 11b, in the second (closed) position of the levers 4 of the gripper 1 the gripping tips 10 of the gripper 1 are at a distance no less than the diameter of the cap, and the is rotatably locked with possible sliding movement along the axis 3 of the gripper 1. In this solution, the tightening torque is transmitted by shape, without preventing the free sliding movement along the axis 3 of the gripper 1. This makes it possible to tighten caps without compensating for the vertical position of the gripper 1 as the cap is being tightened and lowered on the threaded neck of a bottle. While tightening, the cap freely slides out from between the gripping tips 10.

The rigid part 11b is attached to the gripping tip 10 of the gripper 1 in a permanent or detachable manner, e.g. by gluing, riveting, screwing, shape-fitting, moulding over, pouring over, or any other means known in the state of the art. The rigid part 11b and the gripping tip 10 form a solid element or an assembly of elements.

In a preferable embodiment, the gripper 1 has two levers 4 mounted to the body 2, each of which is slidingly mounted to the body 2 by means of guides 6, and two guiding shackles 5, hinge-mounted to the gripper body, whose one end is slidingly and rotatably mounted to the respective lever 4, forming a guiding shackle mechanism. Rotation of the guiding shackle 5 in a first direction (when the lower part of the guiding shackle moves away from the axis of the gripper) causes the lever 4 to slide outwards and take on the first position of the gripper, and the rotation of the guiding shackle 5 in an opposite direction (when the lower part of the guiding shackle approaches the axis of the gripper) causes the lever 4 to slide inwards and take on a second position. During movement, the levers 4 do not make a rotational movement.

Slide movement of the lever 4 reduces the required distance between the grippers 1 in multi-gripper machines. Also smaller is the distance that the gripping tip 10 has to travel through when changing from the first position to the second position and back again, thus reducing the time required to reach the specific position. Consequently, more grippers 1 can be placed in the same working space, according to the embodiment described above, which will work faster than conventional grippers with pivoting levers.

In another preferable embodiment, the gripping tips 10 are adapted so as to avoid any protruding elements of the cap, e.g. the levers of caps equipped with a pump, so that they extend from the point of contact of the gripping tip with the cap in the direction away from the axis 3 of the gripper 1, generally downwards at an angle of 30 degrees in relation to the axis 3, then sideways, and then upwards in such a way that the created shape allows to avoid the protruding elements of the cap. The gripping tips 10 may have more complex shapes, which result from the shape of the elements of the bottle and cap that must be avoided while capping. For an expert, it will be obvious how to shape the gripping tips 10 for a specific type of bottle and cap, so that the right tightening torque is transmitted during the tightening and their protruding elements are avoided.

In a preferable embodiment, the arrangement of the levers 4 is axially symmetrical. In another preferable embodiment, the arrangement of levers 4 is axially asymmetrical, especially for axially asymmetrical caps.

In a preferable embodiment, the grippers 1 are placed in a linear-type capping machine that has five grippers 1 of the present disclosure. This allows to increase the efficiency of the machine.

In another preferable embodiment, the gripper 1 of the present disclosure is mounted on a manual or semi-automatic machine.

In another preferable embodiment, the gripper 1 of the present disclosure is mounted on a robot as an effector, wherein the robot can be of the following types: articulated (arm), cartesian, cylindrical, spherical, delta, SCARA (Selective Compliance Assembly Robot Arm). A robot equipped with at least one gripper 1 of the present disclosure can be a part of a rotary, carousel, or linear production line, and operate in a continuous system, synchronous follow-up/feedback system (e.g. of the 'flying saw' type), or cyclic system (with line downtimes during production processes).

What is claimed is:

1. A gripper for capping machines intended for screwing a cap onto a container, wherein the container is adapted to being capped, said gripper comprises:
    a body capable of revolving on an axis of rotation, and levers adapted to taking at least two different positions:
    a first position in which it is possible to insert a cap between the levers;
    a second position in which the cap is locked between the levers at least rotationally;
    wherein at least one guiding shackle is hinge-mounted to the body so that the at least one guiding shackle is rotatable with respect to the body, at least one lever of the levers is slidingly mounted to the body by means of a guide enabling movement of the at least one lever in a horizontal direction, perpendicular to the axis of rotation, and an end of the at least one guiding shackle is slidingly and rotatably mounted to the at least one lever.

2. The gripper according to claim 1, wherein the at least one lever and the at least one guiding shackle are mounted such that rotation of the at least one guiding shackle in a first direction causes the at least one lever to slide outwards and take on a first position, and the rotation of the at least one guiding shackle in an opposite direction causes the at least one lever to slide inwards and take on a second position.

3. The gripper according to claim 1, wherein the levers are attached to the body of the gripper.

4. The gripper according to claim 3, wherein the levers are distributed in an axially symmetrical way.

5. The gripper according to claim 1, wherein an axis of each lever is parallel to the axis of rotation of the gripper in every position of the lever.

6. The gripper according to claim 1, wherein lower ends of the levers are fitted with gripping tips that have a surface intended to transmit a tightening torque, wherein the tightening torque is transmitted by friction through flexible overlays or by shape through overlays that correspond to the shape of the cap.

7. The gripper according to claim 6, wherein the gripping tips are adapted so as to avoid any protruding elements of the cap due to the fact that the gripping tips extend from the point of contact of the gripping tip with the cap in a direction away from the axis of rotation, first downwards as seen from the axis of rotation.

8. A capping machine of the rotary or linear type, which comprises at least one gripper according to claim 1.

9. The gripper according to claim 1, wherein the container is a bottle.

10. The gripper according to claim 1, wherein the container has a threaded neck for being capped.

11. The gripper according to claim 1, wherein the levers comprise three, four, five or six levers.

* * * * *